March 25, 1969      J. L. HAGER      3,435,106
METHOD FOR AGGLOMERATING POWDERED MATERIAL
Filed May 31, 1966
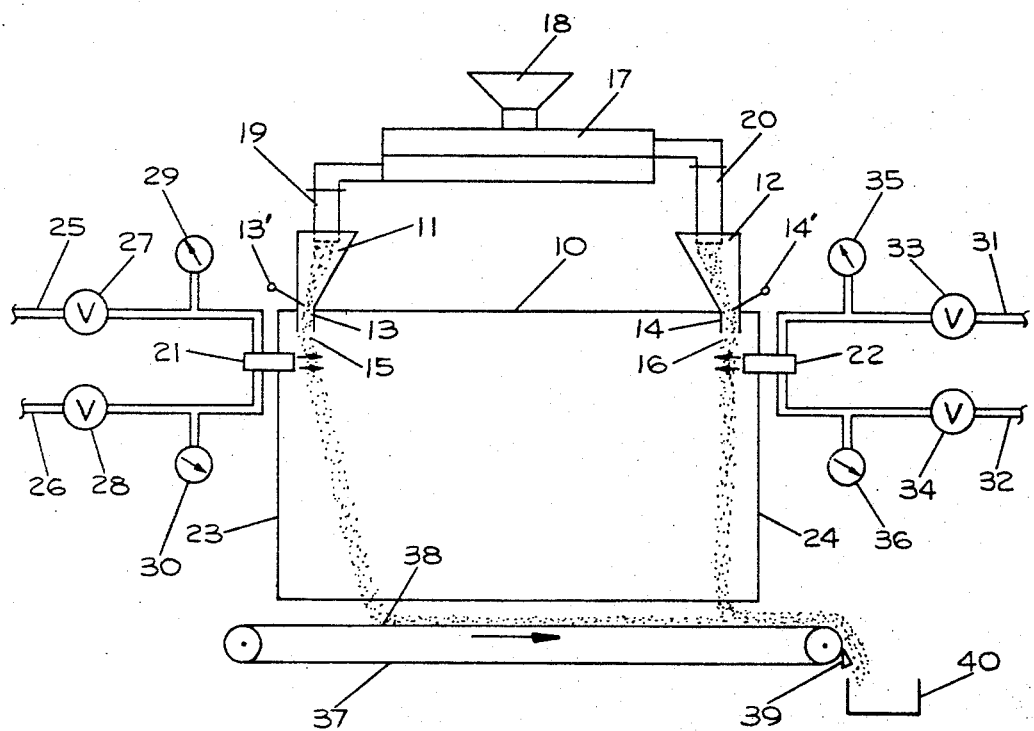
JOHN L. HAGER
INVENTOR.
BY *M. A. Ellerton*
ATTORNEY

United States Patent Office 3,435,106
Patented Mar. 25, 1969

3,435,106
METHOD FOR AGGLOMERATING POWDERED MATERIAL
John L. Hager, Northfield, Minn., assignor to Northfield Processed Food Systems Company Inc., Northfield, Minn., a corporation of Minnesota
Filed May 31, 1966, Ser. No. 553,991
Int. Cl. C09c 1/60, 3/02; A23l
U.S. Cl. 264—113          6 Claims

ABSTRACT OF THE DISCLOSURE

Powdered materials comprising a mixture of coarse and fine particles are agglomerated by separating the powdered materials into two streams of coarse and fine particles, respectively, and spraying the respective streams with separate sprays of moistening fluid, the concentration of moistening fluid being greater on the stream of fine particles; and the agglomerates formed are deposited in superimposed layers on a moving belt.

---

This invention relates to the art of agglomerating whereby certain powdered materials are converted into agglomerates which have a lower bulk density than the powdered material and may be dissovled or dispersed more rapidly than the unagglomerated material. More particularly, the invention relates to an improved method and apparatus for agglomerating powdered material.

Under prior art practices, powdered materials have been agglomerated by directing a moistening fluid, usually wet steam, onto a falling stream, or a dispersed cloud, of the material. In order to effect substantial agglomeration of the material, it has been found necessary to apply a substantial amount of moistening fluid so that the finer particles of the material will become wet and adherent. It is then necessary to subject the agglomerates to an after-drying operation in order to remove the excess amounts of moisture. The application of excess amounts of moisture and the relatively high heat required for after-drying may have a deleterious effect upon agglomerates formed of certain powdered materials. Thus, flavor and color of food products may be adversely affected by the excess moisture and relatively high heat required by the prior art agglomerating practices. The prior art use of warm moistening fluid, such as steam, is objectionable because it heats the powdered material and retards the condensation of moisture thereon. Furthermore, a moist, warm atmosphere is conducive to the bacterial growth so that an agglomerated food product may be rendered unfit for consumption by the growth of harmful bacteria.

One of the objects of this invention is to provide an improved agglomerating method which will overcome the disadvantages of the prior art.

Another object is to provide a method for converting powdered material into agglomerates by the application of a minimum amount of moistening fluid under relatively low temperature conditions.

A further object is to provide a method of agglomerating powered material wherein coarser and finer particles of the material are treated separately with a moistening fluid.

Another object is to provide a method utilizing an agglomerating apparatus having spaced agglomerated zones whereby parts of the material containing the coaser and finer particles, respectively, may be treated separately with a moistening fluid and the resulting agglomerates be combined.

Other objects and advantages of the invention will be apparent in the course of the following description.

The figure of the drawing, to which reference is made, is a schematic diagram of one form of apparatus embodying the invention and suitable for carrying out the improved method.

Apparatus used to carry out the method comprises an elongated agglomerating chamber 10 carrying on its upper side adjacent the ends thereof the two spaced hopper feeders 11 and 12 having the respective spouts 13 and 14 and slide valves 13' and 14' through which falling streams of powdered material 15 and 16 may be directed into chamber 10. Positioned above the chamber 10 is the vibrating screen 17 by means of which powdered material fed into hopper 18 may be graded and divided as to particle size. The part of material having the finer particle sizes is directed into hopper 11 by the conduit 19 and the part of the material having the coarser particle sizes is directed into hopper 12 by conduit 20.

Means for spraying a moistening fluid onto the respective falling streams of material 15 and 16 are provided by the spray nozzles 21 and 22 which are mounted, respectively, in the end walls 23 and 24 of the chamber 10. Moistening fluid, such as water, and compressed air are supplied to nozzle 21 by pipes 25 and 26 which include, respectively, the pressure adjusting valves 27 and 28 and associated gauges 29 and 30. Similarly, nozzle 22 is supplied with water and compressed air by pipes 31 and 32 having associated therewith the respective valves 33 and 34 and pressure gauges 35 and 36. Potable water with a temperature of about 35°–75° F. is supplied to the nozzles.

Positioned at the lower part of chamber 10 is an endless conveyor belt 37 which is mounted to move from left to right as indicated by the arrow. The agglomerates which are formed by the finer particles which are wetted by the fluid from nozzle 21 drop down onto the belt 37 as a layer 38 while the agglomerates formed by wetting the stream 16 of coarser particles drop as a layer upon the first named layer 38. The superposed layers of agglomerates are removed from the belt 37 by a suitable doctor blade 39 so that they drop into a receptacle 40. Instead of being deposited in receptacle 40, the agglomerates may be deposited onto another conveyor belt if further drying action is required or directly into a sizing screen which may be provided with heating means for drying the agglomerates, if necessary.

Since the powdered material is graded as to particle size, it is possible to selectively spray moistening fluid onto separate falling streams of the coarser and finer particles, respectively. For the efficient formation of agglomerates with a minimum amount of moistening fluid, the material containing the coarser particles is wetted with a moistening fluid of low concentration, i.e., with moisture of relatively large droplet size. The finer particles of material can be agglomerated with a minimum amount of moisture by applying the moistening fluid in high concentration, i.e., with moisture of relatively small droplet size. Under the prior art particles, the powdered material is not separated according to particle size and hence it is necessary to apply an excessive amount of moistening fluid to the powdered material in order to properly wet the fine particles for agglomerating action. Accordingly, it is necessary to subject the agglomerates to a relatively high heat drying procedure in order to remove the excess moisture. Such high heat treatment often has a deleterious effect on the agglomerates and especially on high heat drying procedure in order to remove the excess moisture. Such high heat treatment often has a deleterious effect on the agglomerates and especially on such characteristics as flavor, color and storing qualities of certain food products, for example.

The finer particles, so-called fines, of powdered material are difficult to wet in the prior art processes and hence a major portion of the fines must be re-circulated in the system in an attempt to apply sufficient moisture for agglomeration. The equipment used in the prior art practices is usually relatively complicated, bulky and expensive since it generally involves complicated agglomerating chambers, cyclones and heaters.

In one successfully operating embodiment of the present invention, the agglomerating chamber 10 is about 8 feet long, 5 feet high and 4 feet wide. The powdered material is fed down into the chamber 10 from the two hoppers 11 and 12 through the respective spouts 13, 14 which are about 4 inches in diameter with the feed of material controlled by the respective slide valves 13' and 14'. The falling streams of powdered material 15 and 16 are spaced about 3 inches in front of the respective atomizing nozzles 21 and 22. Each of the nozzles has a central .050" aperture for the liquid surrounded by three .020" openings for air and a slotted front aperture which will produce a flat spray of moisture.

In one application of the present invention, a quantity of powdered gelatin all of which had been passed through a 40 mesh screen was graded and separated into two parts by a 60 mesh screen. The part with the finer particles (—60), which had passed through the 60 mesh screen, was collected in hopper 11 and the other part consisting of the coarser particles (+60) was collected in hopper 12. The part with the coarser particles comprised about ⅔ of the weight of the quantity of powdered material and the part with the finer particles was about ⅓ of the weight. Potable water at a temperature of about 60 degrees F. and compressed air were supplied to the respective nozzles. By means of the valves 27 and 28 and associated gauges 29 and 30, water was supplied to the nozzle 21 at a pressure of 10 lbs. per square inch and air at a pressure of 38 lbs. per square inch. This produced a fine mist from nozzle 21 with water supplied at a rate of .09 gal. per hour. Similarly, water was supplied to nozzle 22 at a pressure of 20 lbs. per square inch and with air at a pressure of 38 lbs. per square inch so that a coarse spray was emitted from nozzle 22 at the rate of .74 gal. per hour. The coarser powdered gelatin in hopper 12 was fed into the chamber 10 at the rate of 2.2 lbs. per minute and the part of gelatin with finer particles was fed into chamber 10 at the rate of 1.1 lbs. per minute. The distance from the nozzles 21 and 22 to the respective falling streams of material 15 and 16 was about 3 inches.

The agglomerates from the two zones dropped from belt 37 onto another conveyor belt about 12 feet long and thence into a container which was emptied into a sizing screen. All operations were carried out at normal room temperature and no heating means were required for a drying operation. The orignal powdered gelatin had a moisture content of 12% before agglomeration and a moisture content of 12.1% after agglomeration. After the agglomeration operation, 94% of the total product was +60 mesh, i.e., it would not pass through a 60 mesh screen. The bulk density of the gelatin was 59 grams per 100 cc. before agglomeration and was 38 grams per 100 cc. after agglomeration. The agglomerated gelatin was dispersed readily and quickly in water. When placed on the surface of water at 110° F., one tablespoon of the agglomerated gelatin dropped below the surface in 8 seconds.

From the foregoing, it will be apparent that the objects of the invention have been attained by the provision of an improved method for agglomerating powdered material. The moistening fluid required for agglomeration can be kept to a minimum because the coarser and finer particles are selectively and separately treated with fluid in different amounts and concentrations. Accordingly, little, if any drying operation of the agglomerates is required. Bulky and expensive equipment for retrieving and re-circulating the fines from the agglomerating chamber is not needed for the practice of the present invention.

The agglomerating process of the present invention is practiced without the use of heated moistening fluids such as steam and heated fluids and vapors having relatively high temperatures which in the prior art range from 160° F. to 249° F. in some instances. Equipment for the production of steam is relatively expensive especially if the steam has to be free from substances which might contaminate food products, for example. The warm, moist conditions which are produced in prior art equipment are such as to aid the growth and development of bacteria. Hence, it is possible that harmful bacteria may develop in the agglomerating apparatus and this would be an especially serious matter in the agglomeration of food products.

The method of the present invention has been used in the successful agglomeration of other food products in addition to the pure gelatin herein before mentioned. Thus, successful agglomeration has been effected for a gelatin dessert mix comprising about 4% gelatin and about 96% sugar; for a mixture comprising about 20% cocoa and about 80% sugar; for a mixture comprising about 60% starch and 40% chicken fat and for a baby food mix comprising skim milk powder, lactose and fat. In each case, the powdered mix was separated into two parts according to particle size so that the parts having the coarser and finer particles, respectively, were treated separately with moistening fluid of different concentrations.

I claim:

1. The method of agglomerating a mass of powdered material which comprises forming agglomerates by spraying a first spray of moistening fluid onto one part of a divided falling stream of the material comprising at least the major portion of the coarser particles of the mass of material, forming additional agglomerates by separately spraying a second spray of moistening fluid having a greater concentration of moistening fluid than said first spray onto a second part of the falling stream of the material comprising at least the major portion of the finer particles of the mass of material and combining the resultant agglomerates.

2. The method in accordance with claim 1 wherein the moistening fluid is water at a temperature of 35°–75° F. and the agglomerates formed by the respective parts of material are deposited on a moving surface.

3. The method of agglomerating a mass of powdered material which comprises separating the material into at least two parts according to particle size with the coarser particles in one part and the finer particles in another part, forming agglomerates in spaced agglomerating zones by selectively and separately spraying a moistening fluid onto falling streams of the respective parts of material with the concentration of moistening fluid being greater on the stream of material having the particles of finer size than on the stream of material having the coarser particles, and combining all of the resultant agglomerates.

4. The method of claim 3 wherein the moistening fluid sprayed onto all falling streams is at a temperature of 35°–75° F.

5. The method of claim 3 wherein the agglomerates formed by moistening the different streams of material are deposited as superposed layers on a moving surface.

6. The method in accordance with claim 3 wherein water at 35°–75° F. is the moistening fluid which is atomized and projected laterally against the respective falling streams of powdered material with the water sprayed onto the stream of material of finer particle size having a smaller droplet size than that sprayed onto the stream of material having the larger particle size.

References Cited

UNITED STATES PATENTS

| | | | |
|---|---|---|---|
| 2,893,871 | 7/1959 | Griffin | 99—56 |
| 2,977,203 | 3/1961 | Sienkiewicz et al. | |
| 3,042,526 | 3/1962 | Spiess et al. | |

FOREIGN PATENTS 611,838   1/1961   Canada.

ROBERT F. WHITE, *Primary Examiner.*

JAMES R. HALL, *Assistant Examiner.*

U.S. Cl. X.R.

264—117; 18—4